United States Patent Office 3,037,916
Patented June 5, 1962

3,037,916
FERMENTATION OF TETRACYCLINE
Joseph Jacob Goodman, Nanuet, N.Y., assignor to American Cyanamid Company, New York, N.Y., a corporation of Maine
No Drawing. Filed Oct. 11, 1956, Ser. No. 615,220
18 Claims. (Cl. 195—80)

This invention relates to the fermentation of certain antibiotics of the tetracycline family and more particularly is concerned with the inhibition of chlorination in such fermentations whereby high yields of the desired tetracycline antibiotics are produced.

Recently it has been discovered that microorganisms of the genus Streptomyces which produce chlortetracycline, will also produce tetracycline particularly if the chloride ion concentration of the fermentation medium is kept low. This can be done by providing fermentation media from which chloride ions are excluded, either by making up the fermentation medium with chloride-free components or by treating the medium with agents which remove or sequester the chloride ions, thus making them unavailable for the formation of chlortetracycline.

Unfortunately some of the most effective components of fermentation media for the production of the tetracycline antibiotics contain substantial quantities of chloride ions. Corn steep liquor is one of the most effective nutrient substances for the production of the tetracycline antibiotics as well as many other antibiotics. Apparently, this natural material contains something that is especially desired by the fermenting microorganism. Highest yields of antibiotic are, therefore, obtained when a portion of corn steep liquor is included in the aqueous nutrient medium.

Corn steep liquor contains a substantial amount of chloride ions, however, and if formation of chlortetracycline is to be kept at reasonably low levels, it has heretofore been considered necessary to reduce the chloride content of this material. The same applies to a number of other naturally occurring nutrient materials which are advantageously used in the fermentation process.

Several means of reducing the chloride ion content of aqueous nutrient solutions for tetracycline production have been suggested. Precipitation of the chloride ion as silver chloride is a very effective means of reducing the chloride ion content. However, this is an expensive process requiring expensive raw materials, special equipment, and a toxic gas, hydrogen sulfide, for the recovery of silver.

Ion exchange resins have also been proposed for the reduction of the chloride ion content of fermentation media. These substances tend to remove some salts and organic substances of unidentified composition which are desirable components of the fermentation media. As a result, low yields of antibiotic may be obtained when using nutrient solutions which have been pre-treated with ion exchange resins to remove chloride ions.

The chloride deprivation systems still leave much to be desired, however, because of the capital investment required, the relatively complicated means of removing chloride ions from the fermentation medium, as well as the fact that the fermentation medium can in such instances be composed only of those raw materials from which chloride ions can be easily removed or which are naturally low in chlorides.

It has also been proposed to shift the equilibrium in a tetracycline-chlortetracycline fermentation by the use of bromide which apparently represses chlortetracycline formation in some respects.

The present invention depends for its effectiveness in producing high yields of tetracycline in a fermentation medium in which it is not necessary to remove chloride ions from the system. The present invention is based upon the discovery that when a chlorination inhibitor as hereinafter described is added to a chloride-containing fermentation media, the activities of the microorganism are directed from the synthesis of chlortetracycline to the synthesis of tetracycline. The invention is of extreme practical importance because it obviates the expense and disadvantages of removing chloride ions from the fermentation medium.

Thus, in accordance with one aspect of the present invention a chlortetracycline fermentation can be easily converted to a tetracycline fermentation by the addition to the nutrient medium of a relatively small amount of the novel chlorination inhibitors. For example, as little as 10 parts per million of some of these chlorination inhibitors, which when added to a standard *S. aureofaciens* chlortetracycline fermentation, which in the absence of inhibitors would yield 8700 gammas per milliliter of chlortetracycline and 555 gammas per milliliter of tetracycline, have the effect of converting the fermentation to a tetracycline-producing fermentation and result in the formation of 240 gammas per milliliter of chlortetracycline and 7540 gammas per milliliter of tetracycline. In effect, these novel chlorination inhibitors permit a tetracycline-chlortetracycline ratio of about 99:1 to be produced under standard chlortetracycline fermentation conditions.

The chlorination inhibitors may also be used with equal facility in converting a demethylchlortetracycline fermentation to a demethyltetracycline fermentation. These novel antibiotics form the subject matter of the copending application of J. R. D. McCormick et al., Serial No. 587,518, filed May 28, 1956, now U.S. Patent No. 2,878,289, entitled "New Antibiotics from *Streptomyces aureofaciens*." As described in the aforesaid application these new antibiotics are related to tetracycline and chlortetracycline and differ essentially therefrom in having one less methyl group. The methyl group involved is most likely the one occupying the 6-position on the naphthacene ring. An appropriate chemical name for the tetracycline analogus would be 4-dimethylamino-1,4,4a,5,5a,-6,11,12a - octahydro - 3,6,10,12,12a - pentahydroxy - 1,11-dioxo-2-naphthacenecarboxamide. The chloro analogue would have a chlorine atom in the 7-position and would be named accordingly. Appropriate common names for these new antibiotics would be 6-dimethylchlortetracycline and 6-demethyltetracycline.

As described in detail in the McCormick et al. application these new antibiotics are produced by certain mutant strains of *S. aureofaciens,* some of which have been designated as S604, S1071, V62 and B740. The morphological characteristics of these mutant strains of *S. aureofaciens* are adequately set forth in the McCormick et al. application and cultures of these strains have been deposited with the American Type Culture Collection in Washington, D.C., and have been assigned ATCC accession numbers of 12551, 12552, 12553, and 12554, respectively.

So far as the tetracycline-chlortetracycline fermentation is concerned, I may use any chlortetracycline-tetracycline-producing microorganism of the genus Streptomyces. In this broader aspect of the present invention, it is not necessary to use those mutant strains of *S. aureofaciens* which are needed for the production of the demethyltetracyclines described above. Consequently, in the broader aspects of this invention any microorganism that produces both chlortetracycline and tetracycline by fermentative biosynthesis may be used. Insofar as I am aware, all such microorganisms are of the genus Streptomyces. The species *S. aureofaciens,* which produces chlortetracycline in fermentation media in which chloride ions are present as well as numerous natural and induced mutants is preferably used and such microorganisms will, of course, also produce tetracycline when deprived of chloride ions. A number of other tetracycline-producing microorganisms have been mentioned in the patent literature as alleged distinct species of Streptomyces such *S. viridifaciens, S. sayamaensis, S. feofaciens,* and still others. The published morphological data on these microorganisms is insufficient conclusively to determine whether or not they are new species or merely strains of *S. aureofaciens.* Regardless of this, however, this aspect of the present invention is not predicated upon the selection of a particular species, but as indicated above, is concerned with the use of chlorination inhibitors which direct the activities of the microorganism from the synthesis of chlortetracycline to the synthesis of tetracycline. Consequently, this aspect of the present invention includes any microorganism which produces chlortetracycline and tetracycline.

The chlorination inhibitors of this invention for use in the fermentative biosynthesis of tetracycline and demethyltetracycline are certain 2,5-substituted-1,3,4-azoles which may be represented by the following general formula:

wherein X is a member of the group consisting of NH, S and O; and $R_1$ is a member of the group consisting of SH, SR, SOR, $SO_2R$, $SO_2NH_2$, bromine and chlorine, wherein R is a non-reactive, non-toxic, non-interfering radical such as an alkyl radical, i.e., methyl, ethyl, propyl, butyl, etc., or a monocyclic aryl radical, i.e., phenyl, chlorophenyl, tolyl, etc., or a monocyclic aralkyl radical, i.e., benzyl, phenethyl, phenylpropyl, phenylbutyl, etc.; and wherein $R_2$ is a member of the group consisting of hydrogen, SH, SR, SOR, $SO_2R$, $SO_2NH_2$, bromine and chlorine, and wherein R has the same meaning as above, amino, lower alkylamino such as methylamino, ethylamino, propylamino, etc., allylamino, monocyclic arylamino such phenylamino, chlorophenylamino, etc., monocyclic aralkylamino such as benzylamino, acylamino such as acetylamino, propionylamino, butyrylamino, etc., lower alkyl such as methyl, ethyl, propyl, butyl, etc., monocyclic aryl such as phenyl and substituted phenyl, i.e., chlorophenyl, methoxyphenyl, etc., monocyclic aralkyl such as benzyl, phenethyl, phenylpropyl, phenylbutyl, etc., and heterocyclic radicals such as furyl, thiazolyl and pyridyl.

Among the particularly useful compounds for carrying out the present invention there may be mentioned, 5-amino-2-mercapto-1,3,4-thiadiazole, 2,5-dimercapto-1,3,4-thiadiazole, 2-phenyl-5-mercapto-1,3,4-oxadiazole, 2-(2-furyl)-5-mercapto-1,3,4-oxadiazole, 2-benzyl-mercapto-1,3,4-thiadiazole as well as various other compounds of this invention as will be evident from an inspection of the detailed examples appearing hereinafter.

As in the case of the use of bromide ions in depressing fermentative chlorination the inhibitors of the present invention may be somewhat toxic to the microorganism, especially when used in high concentrations. Fortunately, very small amounts of the inhibitors of this invention depress the formation of chlortetracycline very markedly. As little as one part per million shows some effect. In general, it has been found that the inhibitors may be added in amounts ranging from about one part per million to 500 parts per million, with the optimum range being about five parts per million to about 100 parts per million. Generally speaking, the more inhibitor that is added, the less chlortetracycline will be produced. On the other hand, as continued amounts of the inhibitor are added the toxic effects begin to exert themselves and the total yield of antibiotic is reduced. Hence, no advantage has been observed in going beyond about 500 parts per million and in some cases even less.

Bromide ions may also usefully be added to the fermentation along with the 2-substituted-1,3,4-azoles of this invention. In such instances it has been found that even less of the organic chlorination inhibitor is required to reduce the chlortetracycline to a given level when bromide is added. Consequently, as little as one part per million and in some cases even less of the azole suffices to reduce the chlortetracycline to the desired degree when bromide is added. Accordingly, bromide ion may be used in amounts ranging from as little as one part per million to 6000-7000 parts per million if desired.

It is a further advantage of this invention that the chlorination inhibitors make it possible to use a wide variety of strains of *S. aureofaciens.* That is to say, that with the chloride deprivation systems oftentimes the highest tetracycline-producing strains, that is the chloride scavenging strains, could not be used because they also produced a high level of chlortetracycline. With this invention, however, such strains may be used with facility as the chlorination inhibitors make it possible to easily shift the equilibrium in favor of tetracycline.

The conditions of the fermentation for both tetracycline and demethyltetracycline are generally the same as the presently known methods of producing tetracycline or chlortetracycline by fermentation. That is, the fermentation medium contains the usual nutrients and mineral substances. Suitable nutrient substances which may provide those necessary substances include starch, dextrose, cane sugar, glucose, molasses, soybean meal, peanut meal, yeast, meat extracts, peptone, ammonium sulfate, urea, corn steep liquor, distillers solubles, fish meal and other conventional substances. The inorganic salts include such things as calcium carbonate, ammonium sulfate, ammonium chloride, sodium dihydrogen phosphate, and the various trace elements such as manganese, cobalt, zinc, copper, iron, and the like.

The other general conditions of the fermentation, such as hydrogen ion concentration, temperature, time, rate of aeration, preparation of the inoculum, sterilization, inoculation and the like are conventional and may be similar to those for the production of chlortetracycline shown in the U.S. patent to Duggar No. 2,482,055, and for the production of tetracycline shown in the U.S. patent to Minieri et al. No. 2,734,018. For the production of demethyltetracycline, the selection of a suitable mutant strain of *S. aureofaciens* is necessary as described hereinabove.

Similarly, the recovery of the tetracycline from the fermentation liquor is conventional and need not be described, as numerous methods of recovering tetracycline from fermentation liquors have been published.

In the examples which follow the yields of tetracycline and chlortetracycline are expressed as gammas per milliliter ($\gamma$/ml.).

In the examples that follow, the demethylchlortetracycline and demethyltetracycline content of inhibited mashes is demonstrated by three methods. Paper chromatography using a butanol/0.3 M pH 3 phosphate buffer system effects separation of the two antibiotics, and permits a semiquantitative estimate of the relative amounts of each. Small amounts of tetracycline and chlortetracycline are usually present, but do not interfere. The second method involves measurement of biological activity against both *E. coli* and *S. aureus*. *E. coli* response to demethylchlortetracycline and demethyltetracycline is about equal, while the response of *S. aureus* to demethylchlortetracycline is 3-4 times the response to demethyltetracycline. Therefore, the ratio of *E. coli/S. aureus* will increase as the demethyltetracycline/demethylchlortetracycline ratio increases. The third assay method is based on the so-called Hiscox method which is described in detail in the aforesaid McCormick et al. application and which is specific for demethylchlortetracycline, and upon a spectrophotometric assay which measures both demethylchlortetracycline and demethyltetracycline as demethylchlortetracycline. Decrease of the Hiscox assay of demethylchlortetracycline is accordingly directly proportional to the decrease of demethylchlortetracycline. The excess spectrophotometric potency is presumed to be primarily, but not entirely, due to demethyltetracycline.

The invention will be described in greater detail in conjunction with the following specific examples.

EXAMPLE 1

A chlortetracycline fermentation medium, such as may be used on large scale production, and containing a large amount of chloride ion was made up as follows:

| | |
|---|---|
| Corn flour | grams per liter 14.5 |
| Starch | do 47 |
| Corn steep liquor | do 25 |
| $CaCO_3$ | do 9 |
| $(NH_4)_2SO_4$ | do 5.6 |
| $MnSO_4(70\%)$ | milligrams per liter 80 |
| $CoCl_2.6H_2O$ | do 5 |
| Lard oil | percent by volume 3 |
| Ammonium chloride | grams per liter 1.7 |

To this medium were added varying amounts of 2,5-dimercapto-1,3,4-thiadiazole. The media were dispensed in appropriate amounts into flasks, sterilized, inoculated with vegetative inoculum of *S. aureofaciens* (strain S77) and incubated at 26.5° C. on a rotary shaker for 96 hours. They were then assayed for their chlortetracycline and tetracycline contents. The results obtained are set forth in the table below.

Table 1

| Compound | p.p.m. | Chlortetracycline, γ/ml. | Tetracycline, γ/ml. | Percent Tetracycline |
|---|---|---|---|---|
| Control | 0 | 6,950 | 767 | 11 |
| | 100 | 70 | 6,250 | 98.9 |
| | 200 | 60 | 5,560 | 99.0 |
| | 400 | 45 | 5,260 | 99.2 |
| 2,5-Dimercapto-1,3,4-thiadiazole | 0 | 7,350 | 927 | 87 |
| | 25 | 440 | 7,200 | 94.2 |
| | 50 | 255 | 6,980 | 96.5 |
| | 75 | 190 | 7,025 | 97.4 |
| | 100 | 180 | 6,750 | 97.4 |

EXAMPLE 2

All of the runs reported below were carried out in shaker flasks at 26–27° C. on a rotary shaker operating at 184 r.p.m. The medium, inoculum and harvest time were the same as described in Example 1, the only difference being the addition of different azoles to the fermentation. The results obtained are set forth in the table below.

Table 2

| Compound | p.p.m. | Chlortetracycline, γ/ml. | Tetracycline, γ/ml. | Percent Tetracycline |
|---|---|---|---|---|
| 5-amino-2-mercapto-1,3,4-thiadiazole | 0 | 7,100 | 847 | 10.6 |
| | 25 | 545 | 6,200 | 92.0 |
| | 50 | 375 | 6,225 | 94.0 |
| | 100 | 360 | 5,356 | 84.0 |
| 3-mercapto-1,2,4-triazole | 0 | 4,900 | 687 | 12.3 |
| | 100 | 895 | 887 | 50 |
| 2-(4-pyridyl)-5-mercapto-1,3,4-oxadiazole | 0 | 7,550 | 580 | 7.1 |
| | 20 | 1,040 | 5,850 | 84.9 |
| | 50 | 475 | 4,440 | 90.3 |
| 2-phenyl-5-mercapto-1,3,4-oxadiazole | 0 | 7,550 | 580 | 7.1 |
| | 5 | 170 | 6,100 | 97.2 |
| | 10 | 40 | 3,920 | 98.9 |
| 2-p-chlorophenyl-5-mercapto-1,3,4-oxadiazole | 0 | 7,550 | 580 | 7.1 |
| | 5 | 4,405 | 2,155 | 32.8 |
| | 10 | 780 | 2,965 | 79.1 |
| 2-(2-furyl)-5-mercapto-1,3,4-oxadiazole | 0 | 7,550 | 580 | 7.1 |
| | 5 | 435 | 6,450 | 93.6 |
| | 10 | 160 | 6,805 | 97.7 |
| | 40 | 20 | 1,780 | 98.8 |
| 2-ethylamino-5-mercapto-1,3,4-thiadiazole | 0 | 7,550 | 580 | 7.1 |
| | 5 | 2,540 | 2,130 | 45.8 |
| | 10 | 540 | 1,670 | 74.4 |
| 2-methylamino-5-mercapto-1,3,4-thiadiazole | 0 | 7,550 | 580 | 7.1 |
| | 10 | 910 | 5,150 | 84.9 |
| | 20 | 450 | 4,900 | 91.5 |
| | 50 | 225 | 3,475 | 93.9 |

Table 2—Continued

| Compound | p.p.m. | Chlortetracycline, γ/ml. | Tetracycline, γ/ml. | Percent Tetracycline |
|---|---|---|---|---|
| 2-anilino-5-mercapto-1,3,4-thiadiazole | 0 | 7,550 | 580 | 7.1 |
| | 5 | 1,940 | 1,470 | 43.1 |
| | 10 | 280 | 1,215 | 81.2 |
| 2-allyamino-5-mercapto-1,3,4-thiadiazole | 0 | 7,550 | 580 | 7.1 |
| | 5 | 1,550 | 1,810 | 53.8 |
| | 10 | 270 | 1,382 | 83.5 |
| 2-acetylamino-5-mercapto-1,3,4-thiadiazole | 0 | 7,550 | 580 | 7.1 |
| | 10 | 1,175 | 5,575 | 82.6 |
| | 20 | 445 | 5,360 | 92.3 |
| | 50 | 215 | 4,075 | 94.9 |
| 2-benzylmercapto-1,3,4-thiadiazole | 0 | 6,600 | 770 | 10.5 |
| | 50 | 40 | 4,375 | 99 |
| | 100 | 110 | 4,325 | 97.5 |
| | 200 | 50 | 4,325 | 97.5 |
| 2-(2-thiazolyl)-5-mercapto-1,3,4-oxadiazole | 0 | 6,600 | 770 | 10.5 |
| | 100 | 165 | 2,200 | 93.1 |
| 2-methyl-5-benzylmercapto-1,3,4-thiadiazole | 0 | 6,250 | 862 | 12.1 |
| | 10 | 2,280 | 3,925 | 63.2 |
| | 25 | 475 | 5,400 | 91.9 |
| 2-amino-5-benzylmercapto-1,3,4-thiadiazole | 0 | 6,250 | 862 | 12.1 |
| | 5 | 2,600 | 2,410 | 48.1 |
| | 10 | 1,005 | 4,920 | 83.0 |
| | 25 | 575 | 5,500 | 90.5 |
| 2-benzylsulfonyl-1,3,4-thiadiazole | 0 | 6,750 | 835 | 11.0 |
| | 5 | 720 | 5,060 | 87.5 |
| | 10 | 400 | 5,200 | 92.9 |
| | 25 | 180 | 5,280 | 96.6 |
| 5-anilino-2-benzylmercapto-1,3,4-thiadiazole | 0 | 5,050 | 590 | 10.5 |
| | 5 | 3,775 | 802 | 17.5 |
| | 10 | 3,100 | 1,080 | 25.8 |
| | 25 | 2,300 | 1,115 | 32.6 |
| 2-methylmercapto-1,3,4 thiadiazole | 0 | 5,050 | 590 | 10.5 |
| | 5 | 4,050 | 777 | 16.0 |
| | 10 | 2,200 | 1,385 | 38.6 |
| | 25 | 1,000 | 1,445 | 59.1 |
| 2-acetylamino-5-benzylmercapto-1,3,4-thiadiazole | 0 | 5,050 | 590 | 10.5 |
| | 5 | 2,700 | 2,740 | 50.3 |
| | 10 | 1,180 | 3,340 | 73.8 |
| | 25 | 610 | 3,670 | 85.7 |
| 5 acetylamino-1,3,4-thiadiazole-2-sulfonylmethane | 0 | 5,050 | 590 | 10.5 |
| | 5 | 4,400 | 642 | 12.7 |
| | 10 | 4,500 | 697 | 13.4 |
| | 25 | 3,500 | 1,020 | 22.5 |
| 2,5-dibromo-1,3,4-thiadiazole | 0 | 4,750 | 615 | 11.5 |
| | 5 | 2,505 | 2,330 | 49.2 |
| | 10 | 540 | 3,030 | 84.9 |
| | 25 | 162 | 1,760 | 91.7 |
| 2-amino-5-bromo-1,3,4-thiadiazole | 0 | 4,750 | 615 | 11.5 |
| | 25 | 4,600 | 835 | 15.3 |
| 2-acetamido-5-bromo-1,3,4-thiadiazole | 0 | 4,750 | 615 | 11.5 |
| | 10 | 2,150 | 70 | 3.15 |

EXAMPLE 3

The procedure of Example 2 was repeated except that smaller quantities of the inhibtiors appearing below were used. The results obtained are set forth in the table below:

Table 3

| Compound | p.p.m. | Chlortetracycline, γ/ml. | Tetracycline, γ/ml. | Percent Tetracycline |
|---|---|---|---|---|
| 2-phenyl-5-mercapto-1,3,4-oxadiazole | 0 | 8,700 | 555 | 6.0 |
| | 1 | 2,375 | 2,490 | 51.2 |
| | 2 | 485 | 4,320 | 89.9 |
| | 3 | 210 | 4,160 | 95.2 |
| | 4 | 140 | 3,985 | 96.5 |
| | 5 | 100 | 3,370 | 97.1 |
| 2-(2-furyl)-5-mercapto-1,3,4-oxadiazole | 0 | 8,700 | 555 | 6.0 |
| | 5 | 500 | 6,860 | 93.2 |
| | 6 | 390 | 7,180 | 94.8 |
| | 7 | 335 | 7,300 | 95.6 |
| | 8 | 275 | 7,520 | 96.5 |
| | 9 | 245 | 7,620 | 96.9 |
| | 10 | 240 | 7,540 | 96.9 |
| 2-benzylmercapto-1,3,4-thiadiazole | 0 | 6,850 | 805 | 10.5 |
| | 1 | 5,675 | 1,375 | 19.5 |
| | 3 | 2,605 | 2,955 | 53.1 |
| | 5 | 1,000 | 4,015 | 80.5 |
| | 10 | 450 | 5,080 | 91.9 |

EXAMPLE 4

The following is a tabulation of the combined effect of bromide and 2-(2-furyl)-5-mercapto-1,3,4-oxadiozole. It can be seen that less oxadiazole is required to reduce the chlortetracycline to a given level when bromide is added.

POTASSIUM BROMIDE
[Grams per liter]

| Oxadiazole, p.p.m. | 0 | | 1.0 | | 2.5 | | 4.0 | |
|---|---|---|---|---|---|---|---|---|
| | CTC | TC | CTC | TC | CTC | TC | CTC | TC |
| 0 | 5,200 | 675 | 3,800 | 2,075 | 2,050 | 2,905 | 1,975 | 2,890 |
| 2 | 1,025 | 3,210 | 505 | 3,735 | 260 | 3,700 | 155 | 3,900 |
| 3 | 665 | 3,750 | 265 | 4,240 | 155 | 3,960 | 105 | 3,720 |
| 5 | 365 | 4,080 | 190 | 4,240 | 100 | 3,995 | 90 | 3,790 |
| 7 | 260 | 4,260 | 160 | 4,540 | 90 | 3,160 | 85 | 3,610 |

EXAMPLE 5

Fermentation of *S. aureofaciens* strain V138 was carried out at 26.5° C. for 120 hours in the same medium used for chlortetracycline fermentation (Example 1), containing various levels of 2-phenyl-5-mercapto-1,3,4-oxadiazole.

Paper chromatography of the mashes thus obtained shows the following:

0 p.p.m.—6-demethylchlortetracycline spot larger than 6-demethyltetracycline 2 p.p.m.—6-demethylchlortetracycline spot faint, 6-demethyltetracycline spot increased 10 p.p.m.—6-demethylchlortetracycline spot faint, 6-demethyltetracycline spot increased compared to control.

Microbiological assays gave the following results:

| p.p.m. 2-phenyl-5-mer-capto-1,3,4-oxadiazole | γ/ml. S. aureus | γ/ml. E. coli | E. coli/S. aureus |
|---|---|---|---|
| 0 | 405 | 1,095 | 2.7 |
| 2 | 151 | 641 | 4.2 |
| 5 | 68 | 364 | 5.3 |
| 10 | 61 | 344 | 5.6 |
| 20 | 24 | 124 | 5.2 |

EXAMPLE 6

Example 5 was repeated using 2-(2-furyl)-5-mercapto-1,3,4-oxadiazole as the inhibitor.

Paper chromatographic results were substantially identical to Example 5:

0 p.p.m.—6-demethylchlortetracycline spot larger than 6-demethyltetracycline 5 p.p.m.—Faint 6-demethylchlortetracycline spot, 6-demethyltetracycline spot larger than control 20 p.p.m.—Faint 6-demethylchlortetracycline spot, 6-demethyltetracycline spot larger than control.

Microbiological assays were as follows:

| p.p.m. 2-(2-furyl)-5-mercapto-1,3,4-oxadiazole | γ/ml. S. aureus | γ/ml. E. coli | E. coli/S. aureus |
|---|---|---|---|
| 0 | 405 | 1,095 | 2.7 |
| 5 | 86 | 466 | 5.5 |
| 10 | 63 | 356 | 5.6 |
| 20 | 45 | 192 | 4.3 |

EXAMPLE 7

Example 6 was repeated, extending the fermentation to 140 hours.

Paper chromatography:

0 p.p.m.—6-demethylchlortetracycline and 6-demethyltetracycline spots present 2 p.p.m.—Faint 6-demethylchlortetracycline spot, 6-demethyltetracycline spot increased 5 p.p.m.—Faint 6-demethylchlortetracycline spot, 6-demethyltetracycline spot increased.

| p.p.m. 2-(2-furyl)-5-mercapto-1,3,4-oxadiazole | Spec. 6-demethylchlor-tetracycline +6-methyl-tetracycline | Hiscox demethylchlor-tetracycline |
|---|---|---|
| 0 | 1,152 | 278 |
| 2 | 980 | 0 |
| 5 | 780 | 0-56 |

In this example, the addition of KBr at levels of 1.0–4.0 grams per liter, with and without inhibitor, shows no effect except a decrease of total potency.

EXAMPLE 8

Fermentation of strain S604 was carried out as in Example 5, using 50 p.p.m. of 2,5-dimercapto-1,3,4-thiadiazole as an inhibitor. Paper strips show increased 6-demethyltetracycline and decreased 6-demethylchlortetracycline as compared to the control.

EXAMPLE 9

Example 8 was repeated, extending the fermentation to 140 hours. Paper strips show 6-demethylchlortetracycline and 6-demethyltetracycline in the control; increased 6-demethyltetracycline and no 6-demethylchlortetracycline at 50 and 100 p.p.m. of 2,5-dimercapto-1,3,4-thiadiazole.

This application is a continuation-in-part of my application Serial No. 567,440, filed February 24, 1956, now abandoned.

I claim:

1. In a process of producing a compound selected from the group consisting of tetracycline and demethyltetracycline by aerobic fermentation of an aqueous fermentation medium with a microorganism selected from the group consisting of a tetracycline-producing microorganism of the genus Streptomyces and a demethylchlortetracycline-producing microorganism of the genus Streptomyces, the improvement which comprises adding to said medium a small but effective amount of a chlorination inhibitor of the formula:

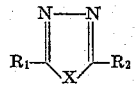

wherein X is a member of the group consisting of NH, S and O; $R_1$ is a member of the group consisting of SH, SR, SOR, $SO_2R$, $SO_2NH_2$, bromine and chlorine, wherein R is a non-reactive, non-toxic, non-interfering, radical, and $R_2$ is a member of the group consisting of hydrogen, SH, SR, SOR, $SO_2R$, $SO_2NH_2$, bromine and chlorine, wherein R has the same meaning as hereinbefore defined, amino, lower alkylamino, allylamino, monocyclic arylamino, monocyclic aralkylamino, acylamino, lower alkyl, monocyclic aryl, monocyclic aralkyl, furyl, thiazolyl and pyridyl radicals, which inhibits the formation of chlortetracycline and demethylchlortetracycline and causes the formation of substantial quantities of tetracycline and demethyltetracycline.

2. In a process of producing tetracycline by aerobic fermentation of an aqueous fermentation medium with a tetracycline-producing strain of *S. aureofaciens*, the improvement which comprises adding to said medium a small but effective amount of a chlorination inhibitor of the formula:

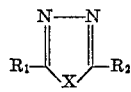

wherein X is a member of the group consisting of NH, S and O; $R_1$ is a member of the group consisting of SH, SR, SOR, $SO_2R$, $SO_2NH_2$, bromine and chlorine wherein R is a non-reactive, non-toxic, non-interfering radical, and $R_2$ is a member of the group consisting of hydrogen, SH, SR, SOR, $SO_2R$, $SO_2NH_2$, bromine and chlorine, wherein R has the same meaning as hereinbefore defined, amino, lower alkylamino, allylamino, monocyclic arylamino, monocyclic aralkylamino, acylamino, lower alkyl, monocyclic aryl, monocyclic aralkyl, furyl, thiazolyl and pridyl radicals, which inhibits the formation of chlortetracycline and causes the formation of substantial quantities of tetracycline.

3. In a process of producing demethyltetracycline by aerobic fermentation of an aqueous fermentation medium with a demethylchlortetracycline-producing strain of *S. aureofaciens*, the improvement which comprises adding to said medium a small but effective amount of a chlorination inhibitor of the formula:

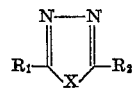

wherein X is a member of the group consisting of NH, S and O; $R_1$ is a member of the group consisting of SH, SR, SOR, $SO_2R$, $SO_2NH_2$, bromine and chlorine, wherein R is a non-reactive, non-toxic, non-interfering radical, and $R_2$ is a member of the group consisting of hydrogen, SH, SR, SOR, $SO_2R$, $SO_2NH_2$, bromine and chlorine, wherein R has the same meaning as hereinbefore defined, amino, lower alkylamino, allylamino, monocyclic arylamino, monocyclic aralkylamino, acylamino, lower alkyl, monocyclic aryl, monocyclic aralkyl, furyl, thiazolyl and pyridyl radicals, which inhibits the formation of demethylchlortetracycline and causes the formation of substantial quantities of demethyltetracycline.

4. A process according to claim 1 in which the chlorination inhibitor is 2,5,dimercapto-1,3,4-thiadiazole.

5. A process according to claim 1 in which the chlorination inhibitor is 5-amino-2-mercapto-1,3,4-thiadiazole.

6. A process according to claim 1 in which the chlorination inhibitor is 2-phenyl-5-mercapto-1,3,4-oxadiazole.

7. A process according to claim 1 in which the chlorination inhibitor is 2-(2-furyl)-5-mercapto-1,3,4-oxadiazole.

8. A process according to claim 1 in which the chlorination inhibitor is 2-benzylmercapto-1,3,4-thiadiazole.

9. A process of producing tetracycline by aerobic fermentation of a chloride-containing aqueous fermentation medium with a tetracycline-producing strain of *S. aureofaciens* which comprises the step of adding to said medium from about 1 to 500 parts per million of a chlorination inhibitor of the formula:

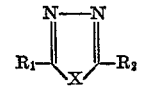

wherein X is a member of the group consisting of NH, S and O; $R_1$ is a member of the group consisting of SH, SR, SOR, $SO_2R$, $SO_2NH_2$, bromine and chlorine, wherein R is a non-reactive, non-toxic, non-interfering radical, and $R_2$ is a member of the group consisting of hydrogen, SH, SR, SOR, $SO_2R$, $SO_2NH_2$, bromine and chlorine, wherein R has the same meaning as hereinbefore defined, amino, lower alkylamino, allylamino, monocyclic arylamino, monocyclic aralkylamino, acylamino, lower alkyl, monocyclic aryl, monocyclic aralkyl, furyl, thiazolyl and pyridyl radicals, which inhibits the formation of chlortetracycline and causes the formation of substantial quantities of tetracycline.

10. A process of producing demethyltetracycline by aerobic fermentation of a chloride-containing aqueous fermentation medium with a demethylchlortetracycline-producing strain of *S. aureofaciens* which comprises the step of adding to said medium from about 1 to 500 parts per million of a chlorination inhibitor of the formula:

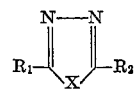

wherein X is a member of the group consisting of NH, S and O; and $R_1$ is a member of the group consisting of SH, SR, SOR, $SO_2R$, $SO_2NH_2$, bromine and chlorine, wherein R is a non-reactive, non-toxic, non-interfering radical, and $R_2$ is a member of the group consisting of hydrogen, SH, SR, SOR, $SO_2R$, $SO_2NH_2$, bromine and chlorine, wherein R has the same meaning as hereinbefore defined, amino, lower alkylamino, allylamino, monocyclic arylamino, monocyclic aralkylamino, acylamino, lower alkyl, monocyclic aryl, monocyclic aralkyl, furyl, thiazolyl and pyridyl radicals, which inhibits the formation of demethylchlortetracycline and causes the formation of substantial quantities of demethyltetracycline.

11. A process according to claim 9 in which the amount of chlorination inhibitor is added to the extent of from about 5 parts per millions to about 100 parts per million.

12. A process according to claim 9 in which the chlorination inhibitor is 2,5-dimercapto-1,3,4-thiadiazole.

13. A process according to claim 9 in which the chlorination inhibitor is 5-amino-2-mercapto-1,3,4-thiadiazole.

14. A process according to claim 9 in which the chlorination inhibitor is 2-phenyl-5-mercapto-1,3,4-oxadiazole.

15. A process according to claim 9 in which the chlorination inhibitor is 2-(2-furyl)-5-mercapto-1,3,4-oxadiazole.

16. A process according to claim 9 in which the chlorination inhibitor is 2-benzylmercapto-1,3,4-thiadiazole.

17. A process according to claim 9 in which the fermentation medium also contains at least about one part per million of bromide ions.

18. In a process for producing tetracycline by aerobic fermentation with a chlortetracycline-producing microorganism of the genus Streptomyces, the improvement which comprises conducting the fermentation in the presence of an amount of 2,5-dimercapto-1,3,4-thiadiazole effective to suppress the production of chlortetracycline, whereby the production of tetracycline is favored.

References Cited in the file of this patent

UNITED STATES PATENTS

| | | |
|---|---|---|
| 2,734,018 | Minieri et al. | Feb. 7, 1956 |
| 2,739,924 | Lein et al. | Mar. 27, 1956 |

FOREIGN PATENTS

| | | |
|---|---|---|
| 316,291 | Switzerland | Sept. 30, 1956 |

OTHER REFERENCES

Martell et al.: Chemistry of the Metal Chelate Compounds, Prentice Hall, Inc., Englewood Cliffs, N.J., pp. 135 to 139, 303–305, 471.

Sekizawa: Jour. of Biochemistry, vol. 40, No. 2, March 1955, pp. 217–218.